United States Patent [19]

Butsuen et al.

[11] Patent Number: 5,574,644
[45] Date of Patent: *Nov. 12, 1996

[54] AUTOMATIC BRAKE CONTROL SYSTEM

[75] Inventors: Tetsuro Butsuen, Hiroshima-ken; Tohru Yoshioka, Hatsukaichi, both of Japan

[73] Assignee: Mazda Motor Corporation, Hiroshima-ken, Japan

[*] Notice: The term of this patent shall not extend beyond the expiration date of Pat. No. 5,420,792.

[21] Appl. No.: 396,943

[22] Filed: Mar. 1, 1995

Related U.S. Application Data

[63] Continuation of Ser. No. 37,634, Mar. 26, 1993, Pat. No. 5,420,792.

[30] Foreign Application Priority Data

Mar. 30, 1992 [JP] Japan ..................... 4-106200

[51] Int. Cl.⁶ ........................................... B60T 8/58
[52] U.S. Cl. .................. 364/426.04; 364/461; 342/455; 340/903; 180/169; 180/170
[58] Field of Search ............... 364/426.04, 431.07, 364/460, 461; 180/167–170, 176–179; 123/350, 352; 342/454, 455; 340/903, 904

[56] References Cited

U.S. PATENT DOCUMENTS

| | | | |
|---|---|---|---|
| 5,014,200 | 5/1991 | Chundrlik et al. | 364/426.04 |
| 5,165,497 | 11/1992 | Chi | 340/904 |
| 5,189,619 | 2/1993 | Adachi et al. | 340/903 |
| 5,197,562 | 3/1993 | Kakinami et al. | 180/169 |
| 5,230,400 | 7/1993 | Kakinami et al. | 364/461 |
| 5,251,680 | 10/1993 | Minezawa et al. | 180/169 |
| 5,278,764 | 1/1994 | Iizuka et al. | 364/461 |
| 5,357,438 | 10/1994 | Davidian | 364/461 |
| 5,420,792 | 5/1995 | Butsuen et al. | 364/426.04 |

FOREIGN PATENT DOCUMENTS

| | | |
|---|---|---|
| 54-33444 | 3/1979 | Japan . |
| 64-83 | 1/1989 | Japan . |

*Primary Examiner*—Gary Chin
*Attorney, Agent, or Firm*—Keck, Mahin & Cate

[57] ABSTRACT

An automatic brake control system produces a warning before automatically making the braking action of a driving vehicle according to the velocities of the driving vehicle and the vehicle ahead. The system calculates the desired vehicle distance according to the velocities of the driving vehicle and the vehicle ahead, and sets a warning distance which is longer than the desired vehicle distance. The warning distance is set in accordance with the driver's feeling. According to the present invention, the system is prevented from producing undesirable warning.

4 Claims, 7 Drawing Sheets

AUTOMATIC BRAKE CONTROL SYSTEM

This is a continuation of application Ser. No. 08/037,634, filed Mar. 26, 1993 now U.S. Pat. No. 5,420,792.

BACKGROUND OF THE INVENTION

1. Field of the Invention

The present invention relates to an automatic brake control system which automatically applies a braking force to a driving vehicle according to the running velocity of the driving vehicle and a vehicle ahead which is running ahead of the driving vehicle and the distance therebetween.

2. Description of Related Art

Conventionally, many systems have been known that a radar unit thereof detects the distance between the driving vehicle and the obstacle or vehicle ahead and the relative velocity therebetween so that the system produces a warning and automatically makes a braking action for the driving vehicle when the driving vehicle is driven dangerously close to the obstacle or the vehicle ahead. For example, Japanese Patent Public Disclosure No.54-33444, laid open to the public in 1979, discloses a system which produces a warning when the actual distance between the driving vehicle and the obstacle ahead thereof becomes less than a value which is provided by adding predetermined distance to a quick braking distance determined by the relative distance and velocity of the two vehicles or the driving vehicle and obstacle wherein the braking force is quickly applied to the driving vehicle under the quick braking action when the actual distance becomes less than the quick braking distance. Further, Japanese Utility Model Public Disclosure No.64-83, laid open to the public in 1989, describes a system which calculates the warning distance for producing a warning based on the velocity of the driving vehicle and the relative distance and velocity between the driving vehicle and vehicle ahead, and which produces a warning, when the two vehicles get close to each other less than the warning distance, so that the sound of the warning changes by two steps sequentially.

Figure 7:
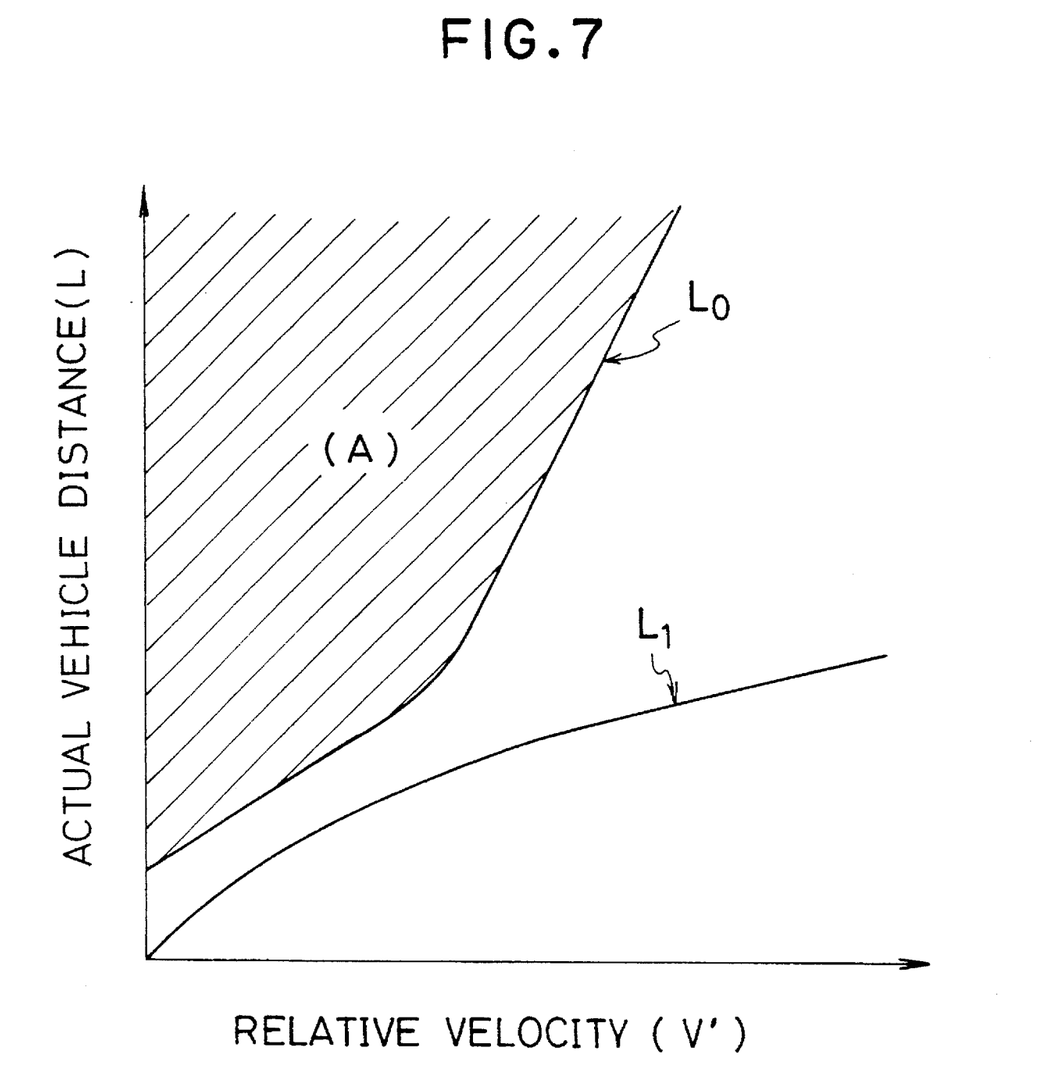
FIG. 7 is a graph showing the relationship between the relative velocity and the desired vehicle distance.

A desired vehicle distance between the driving vehicle and the vehicle ahead which is necessary for the driving vehicle to safely avoid the obstacle or the vehicle ahead (the velocity of the driving vehicle $V_1$ being greater than that of the vehicle ahead $V_2$) can be calculated by subtracting the braking distance of the vehicle ahead from that of the driving vehicle at the quick braking action. Thus, the desired vehicle distance $L_1$ is provided by the following equation.

$$L_1 = (V_1)^2/2\alpha_1 g - (V_2)^2/2\alpha_2 g$$

Wherein $\alpha_1 g$ and $\alpha_2 g$ are the decelerations of the driving vehicle and the vehicle ahead respectively. As shown in FIG. 7, the desired vehicle distance $L_1$ is needed to be increased, as a difference between $V_1$ and $V_2$ or a relative velocity $V'$ between the driving vehicle and the vehicle ahead is increased.

A driver's braking vehicle distance $L_0$ at which the driver actually starts the braking action taking account of the change of the vehicle distance is also shown in FIG. 7. When the relative distance and velocity are in the hatched portion (A) in FIG. 7, the driver actually makes the braking action. As seen from FIG. 7, the driver's braking vehicle distance $L_0$ is set close to the desired vehicle distance $L_1$ when the relative velocity $V'$ is small. On the other hand, when the relative velocity $V'$ is big or when the driving vehicle quickly gets close to the vehicle ahead, the driver's braking vehicle distance $L_0$ is considerably greater than the desired vehicle distance $L_1$. In the area where the relative velocity $V'$ is comparatively big, if the warning distance is set close to the driver's braking vehicle distance $L_0$, the warning is produced at the substantially same timing as the driver's braking operation. However, the warning would be undesirably produced because the warning distance is too far from the desired vehicle distance $L_1$. On the other hand, if the warning distance is set too close to the desired vehicle distance $L_1$, the driver feels uneasy so that the warning is useless because no substantial time is left for the driver to make a braking action after warning.

SUMMARY OF THE INVENTION

It is therefore an object of the present invention to provide an automatic brake control system which timely produces a warning well before the braking action of the driving vehicle preventing a undesirable or useless warning.

It is another object of the present invention to calculate a proper desirable vehicle distance between the driving vehicle and the vehicle ahead taking account of the friction coefficient of road surface, a deceleration of the vehicle as well as relative velocity so that the warning distance is set more properly.

In accordance with the present invention, the foregoing objects can be achieved by providing an automatic brake control system for automatically braking a driving vehicle according to the velocities of a driving vehicle and a vehicle ahead and a vehicle distance therebetween, comprising braking means for braking the driving vehicle, first detecting means for detecting the velocities of the respective vehicles and the distance therebetween, calculating means for calculating a desirable distance between the two vehicles to be kept based on the velocities of the respective vehicles detected by the first detecting means, control means for controlling the braking means when an actual distance between the two vehicles is reduced smaller than the desirable distance warning means for producing a warning when the actual distance is smaller than a warning distance which is longer than the desirable distance by a predetermined value, and setting means for increasing the warning distance, as the velocity difference between the two vehicles is increased.

In the preferred embodiment of the present invention, the automatic brake control system further comprises second detecting means for detecting the friction coefficient of road surface and third detecting means for detecting a deceleration of the driving vehicle and the vehicle ahead.

Preferably, the desired vehicle distance and the warning distance are provided as the following equations respectively:

$$L_1 = (V_1)^2/2\alpha_1 g - (V_2)^2/2\alpha_2 g$$

$$L_2 = (V_1)^2/2\alpha_1 g - (V_2)^2/2\alpha_2 g + K(V_1 - V_2)^2;$$

wherein $L_1$ is the desired vehicle distance, $L_2$ is the warning distance, $V_1$ and $V_2$ are the velocities of the driving vehicle and the vehicle ahead respectively, g is the acceleration of gravity, $\alpha_1 g$ and $\alpha_2 g$ are the decelerations of the driving vehicle and the vehicle ahead respectively, and K is the safety factor.

It is preferred that the safety factor K is reduced, as the difference between the velocities of the driving vehicle and the vehicle ahead detected by the first detecting means is increased. The warning produced by the warning means may be provided as an automatic slight braking action.

Preferably, the automatic brake control system further comprises second calculating means for calculating the friction coefficient of road surface based on the slip ratio of the driving vehicle in the slight braking condition established based on operation of the warning means, compensating means for compensating the desired vehicle distance according to the friction coefficient of road surface calculated by the second calculating means.

Another aspect of the invention, the braking means is allowed to be operated by the driver even when the driving vehicle is in the slight braking condition established through the operation of the warning means.

The desired vehicle distance and the warning distance may be provided as the following equations respectively:

$$L_1 = (V_1)^2/2\alpha_1 g - (V_2)^2/2\alpha_2 g;$$

$$L_2 = (V_1)^2/2\alpha_1 g - (V_2)^2/2\alpha_2 g + K(V_1-V_2)^2/2\alpha;$$

wherein $L_1$ is the desired distance, $L_2$ is the warning distance, $V_1$ and $V_2$ are the velocities of the driving vehicle and the vehicle ahead respectively, g is the acceleration of gravity, $\alpha_1 g$ and $\alpha_2 g$ are the decelerations of the driving vehicle and the vehicle ahead respectively, K is the safety factor and $\alpha$ is the safety ratio.

Further objects, features, and advantages of the present invention will become apparent from the Detailed Description of the Preferred Embodiments which follows, when considered together with the attached drawings.

BRIEF DESCRIPTION OF THE DRAWINGS

These and other objects and features of the invention will be described in detail with reference to the annexed drawings wherein.

DETAILED DESCRIPTION OF THE PREFERRED EMBODIMENTS

Figure 1:
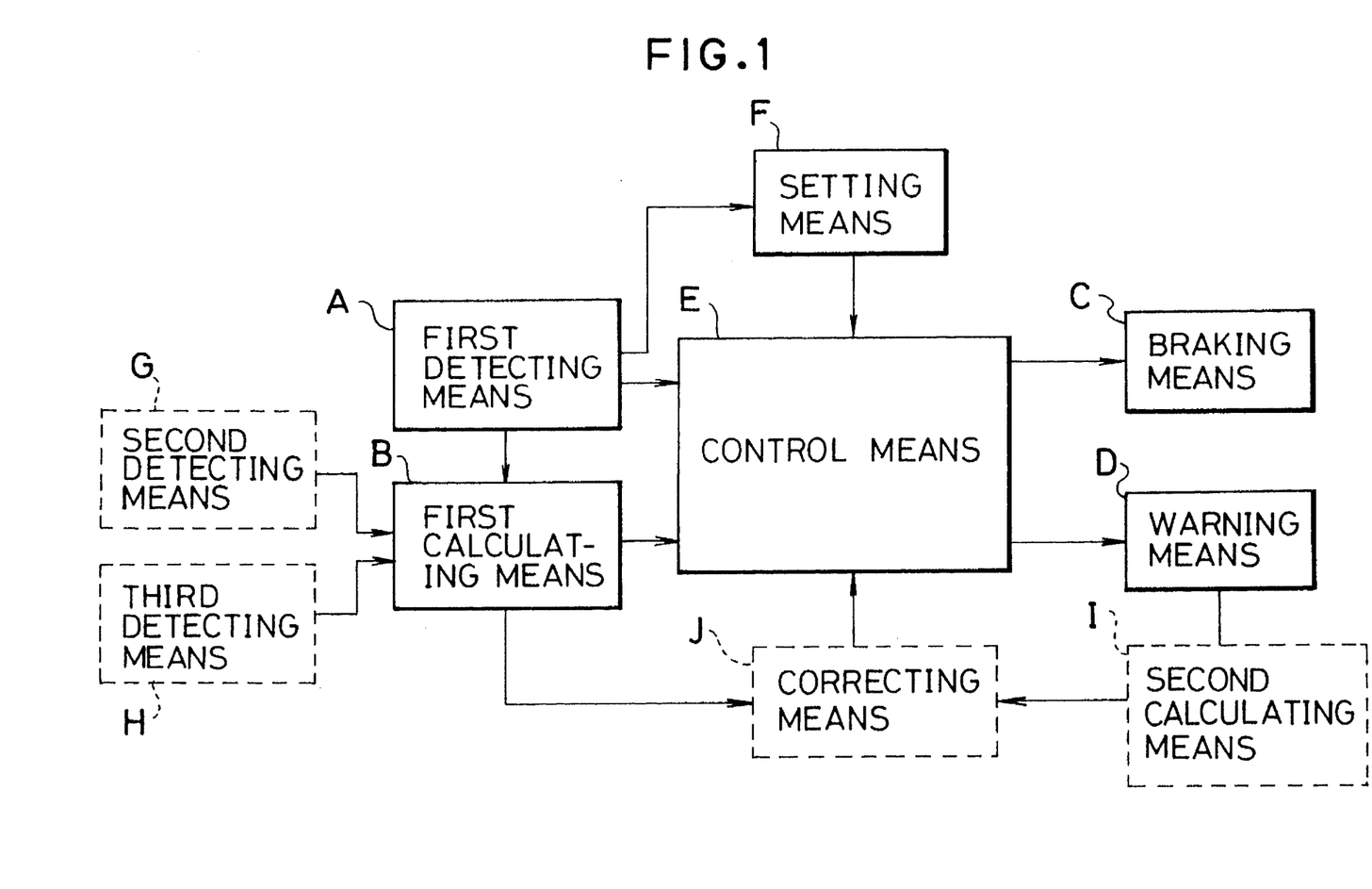
FIG. 1 is a functional block diagram showing the structure of the automatic brake control system according to the invention.
Figure 2:
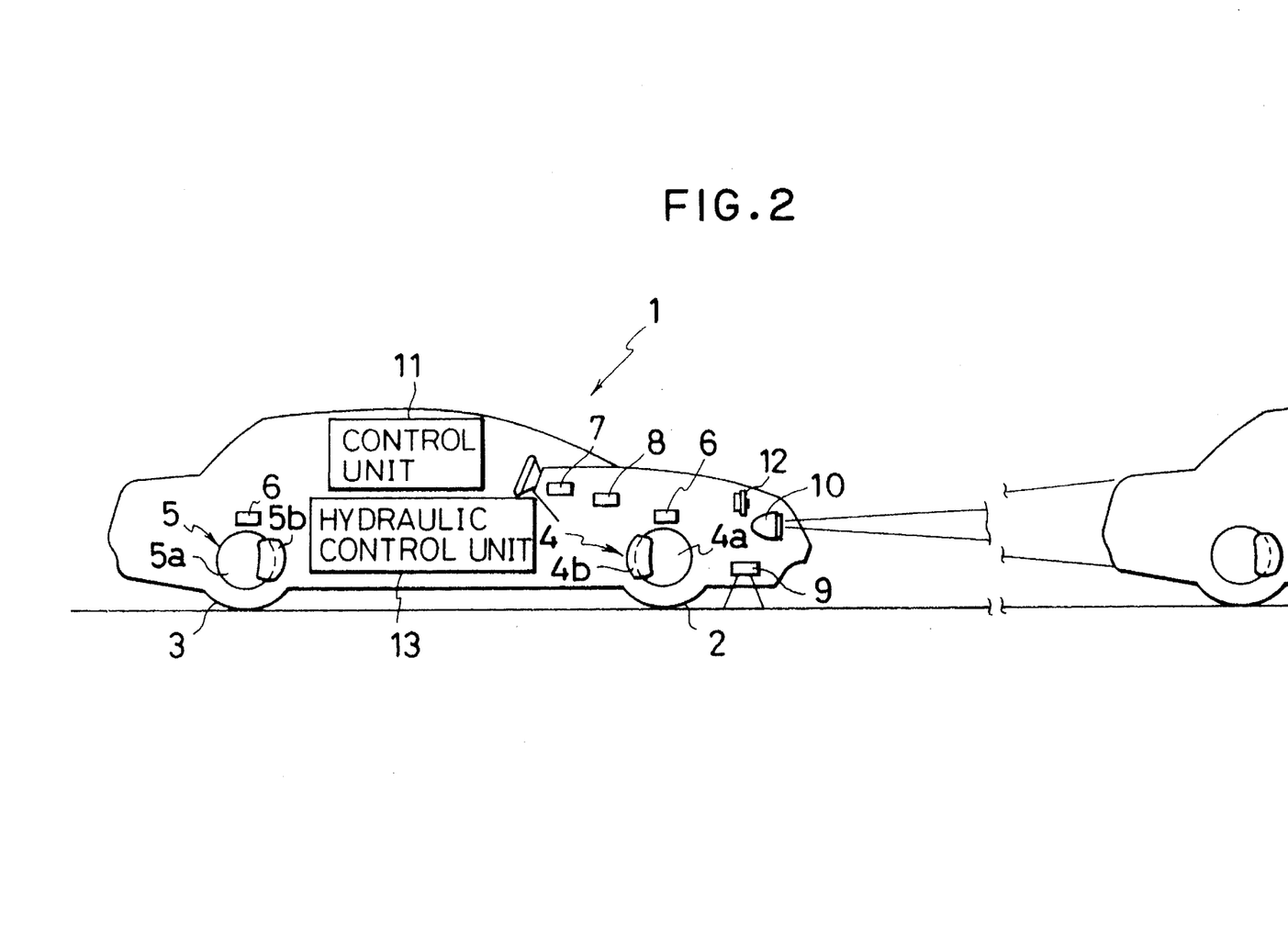
FIG. 2 is a schematic block diagram of the automatic brake control system according to the preferred embodiment.
Figure 3:
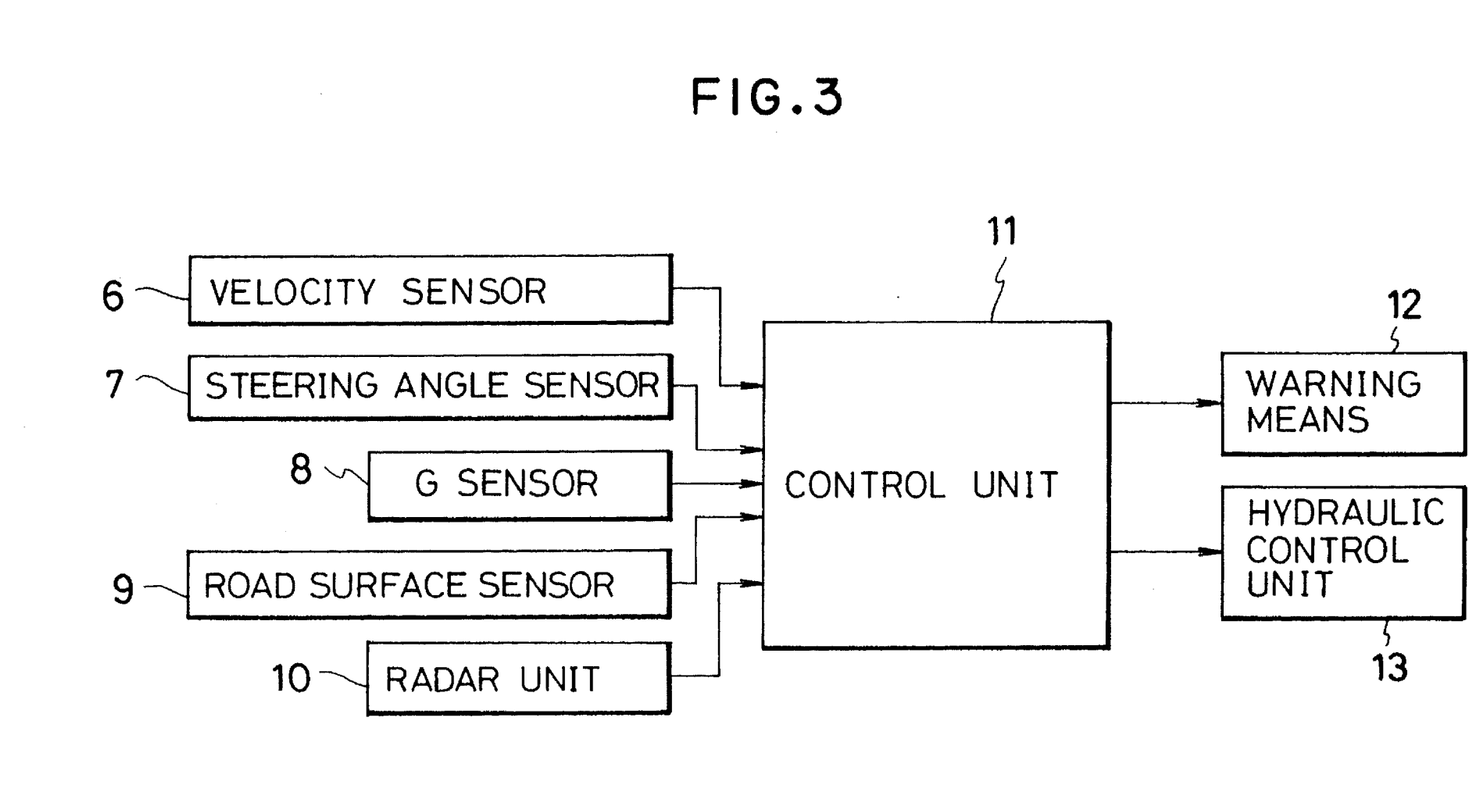
FIG. 3 is a system block diagram showing the schematic structure of the automatic brake control system.

Now, with reference to FIGS. 1 and 2, an automatic brake control system according to the preferred embodiment of the present invention will be described. A vehicle 1 is provided with brake mechanisms 4 and 5 for front and rear wheels 2 and 3 respectively. Brake mechanisms 4 and 5 comprise disc rotors 4a and 5a rotating with wheels 2 and 3, calipers 4b and 5b for braking the rotation of disc rotors 4a and 5a when hydraulic fluid for braking control is supplied. Further, vehicle 1 comprises velocity sensors 6, provided with each wheel, for detecting the velocity of vehicle 1 based on the rotation of each wheel, steering angle sensor 7 for detecting the steering angle, G sensor 8 for detecting the deceleration of vehicle 1, road surface sensor 9 for optically detecting the friction coefficient of the road surface by the reflection of infrared rays and the like applied to the road surface, radar unit 10 for detecting the distance between the driving vehicle and the vehicle ahead by irradiating laser beams and the like, and a control unit 11 for receiving signals from sensors 6–9 and radar unit 10.

Figure 4:
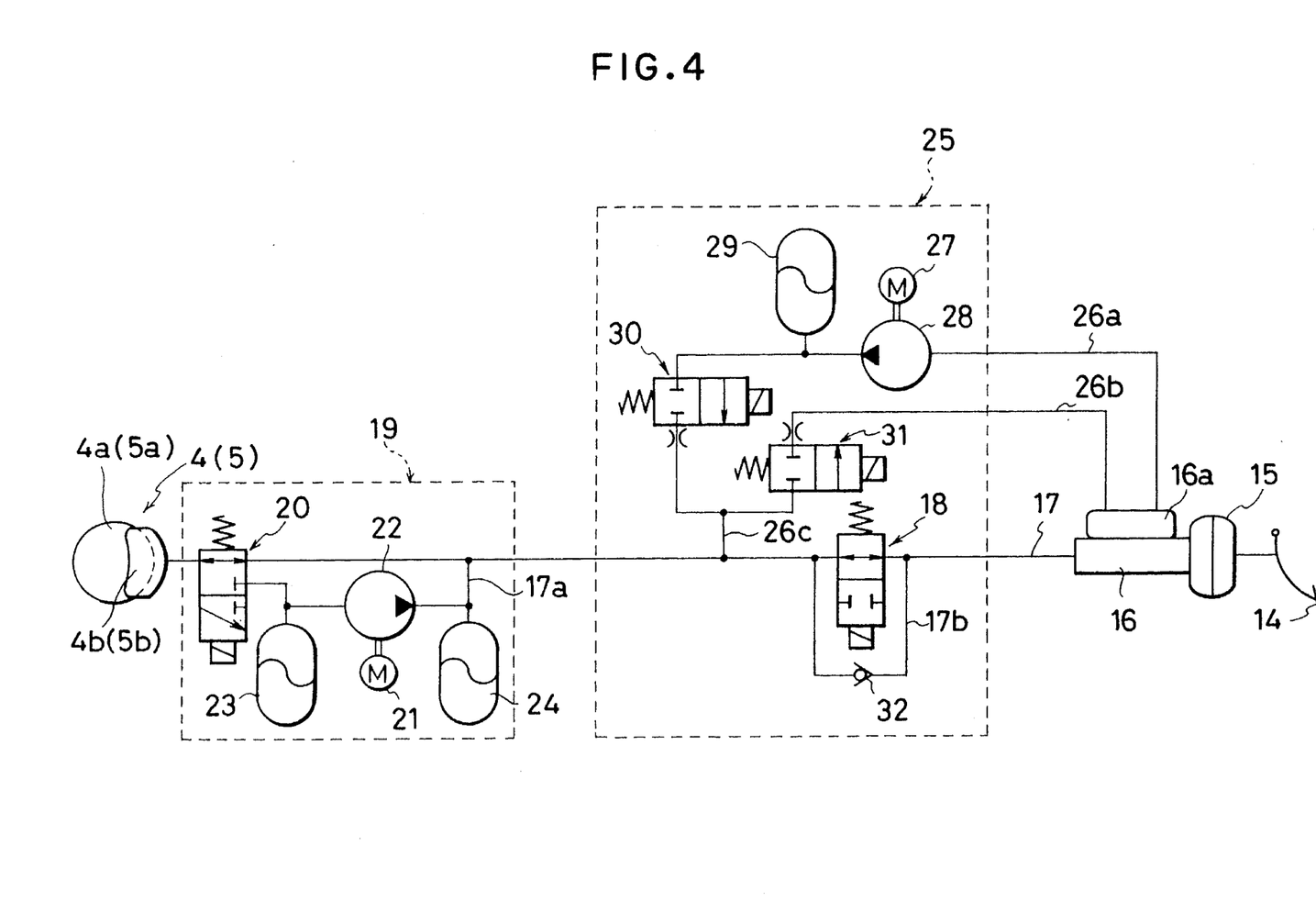
FIG. 4 is a hydraulic circuit diagram of the braking mechanism in the automatic brake control system.

Referring to FIG. 4, hydraulic control unit 13 will be described. Hydraulic control unit 13 comprises a booster 15 for increasing the force applied to a brake pedal 14 and a master cylinder 16 for generating braking hydraulic pressure according to the force increased by booster 15. Master cylinder 16 and calipers 4b and 5b in brake mechanisms 4 and 5 are connected to first supply passage 17. Solenoid on-off valve 18 is connected to the lower stream. Anti-skid brake unit 19 comprises switching valve 20 connected to first supply passage 17, branch passage 17a branching off from first supply passage 17 and connected to switching valve 20, first hydraulic pump 22 provided on branch passage 17a and driven by a hydraulic motor 21, and first and second accumulators 23 and 24 connected respectively to the discharge side and inhalation side of hydraulic pump 22. Switching valve 20, hydraulic motor 21 and first hydraulic pump 22 are controlled by control unit 11.

Hydraulic control unit 13 further comprises an automatic braking unit 25. An automatic braking unit 25 comprises a second supply passage 26a connected to reservoir tank 16a provided with master cylinder 16, second hydraulic pump 28 provided on second supply passage 26a and driven by a hydraulic motor 27, accumulator 29, connected to second supply passage 26a, for maintaining brake fluid from second hydraulic pump 28 at a predetermined pressure, solenoid on-off valve 30, connected to second supply passage 26a, for increasing pressure, return passage 26b for decreasing pressure, and connecting passage 26c for connecting on-off valves 30 and 31 to first supply passage 17. Hydraulic motor 27, second hydraulic pump 28 and solenoid valves 30 and 31 are controlled by control unit 11. Check valve 32 is provided on a bypass passage 17b connecting upper and lower streams of on-off valve 18 on first supply passage 17.

When brake pedal 14 is pressed on by the driver, master cylinder 16 introduces predetermined hydraulic pressure into calipers 4b and 5b in brake mechanisms 4 and 5 through on-off valve 18 and switching valve 20 in anti-skid brake unit 19, so that the braking force is applied to front and rear wheels 2 and 3. In this braking operation, signals are input into control unit 11 from velocity sensor 6 and G sensor 8. Based on the signals from the sensors, control unit 11 outputs control signals to switching valve 20 in anti-skid brake unit 19 so that the operation of switching valve 20 is controlled. By the control of switching valve 20, hydraulic pressure supplied to calipers 4b and 5b is increased or decreased so that wheels 2 and 3 are kept unlocked and the maximum braking force is attained. Further, when control unit 11 judges a predetermined condition is realized, control unit 11 controls automatic braking unit 25 so that brake fluid is supplied through connecting passage 26c and first supply passage 17 to calipers 4b and 5b by the operation of on-off valves 30 and 31. Thus, the driving vehicle is automatically applied the brakes to regardless of the operation of brake pedal 14. In the automatic braking condition, when brake pedal 14 is pressed on by the driver, brake fluid is supplied from master cylinder 16 to calipers 4b and 5b so that wheels 2 and 3 are controlled. Therefore the driver can manually apply the brakes to the driving vehicle even in the automatic braking condition.

Figure 5:
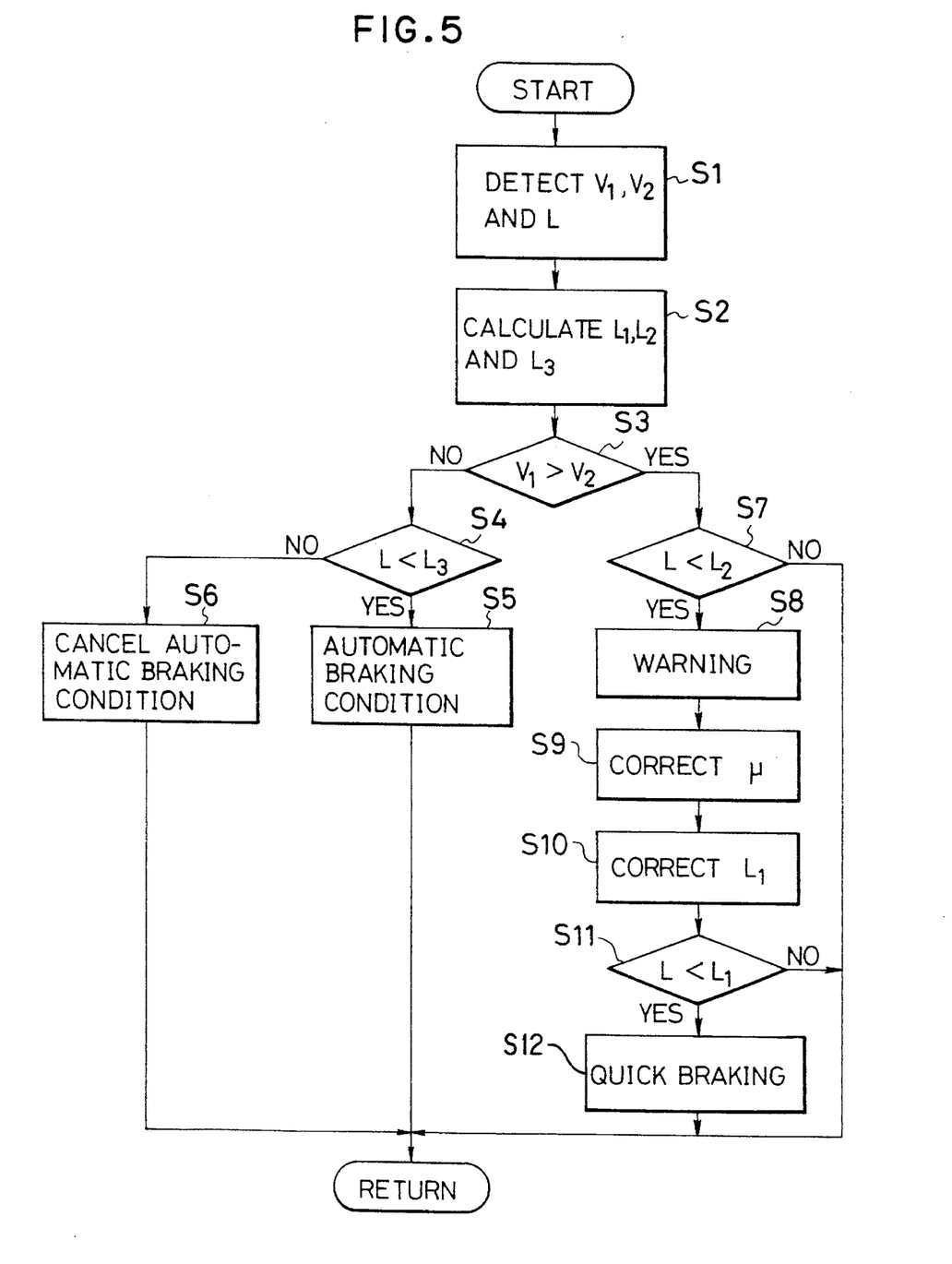
FIG. 5 is a flow chart showing the control operation by the control unit.
Figure 6:
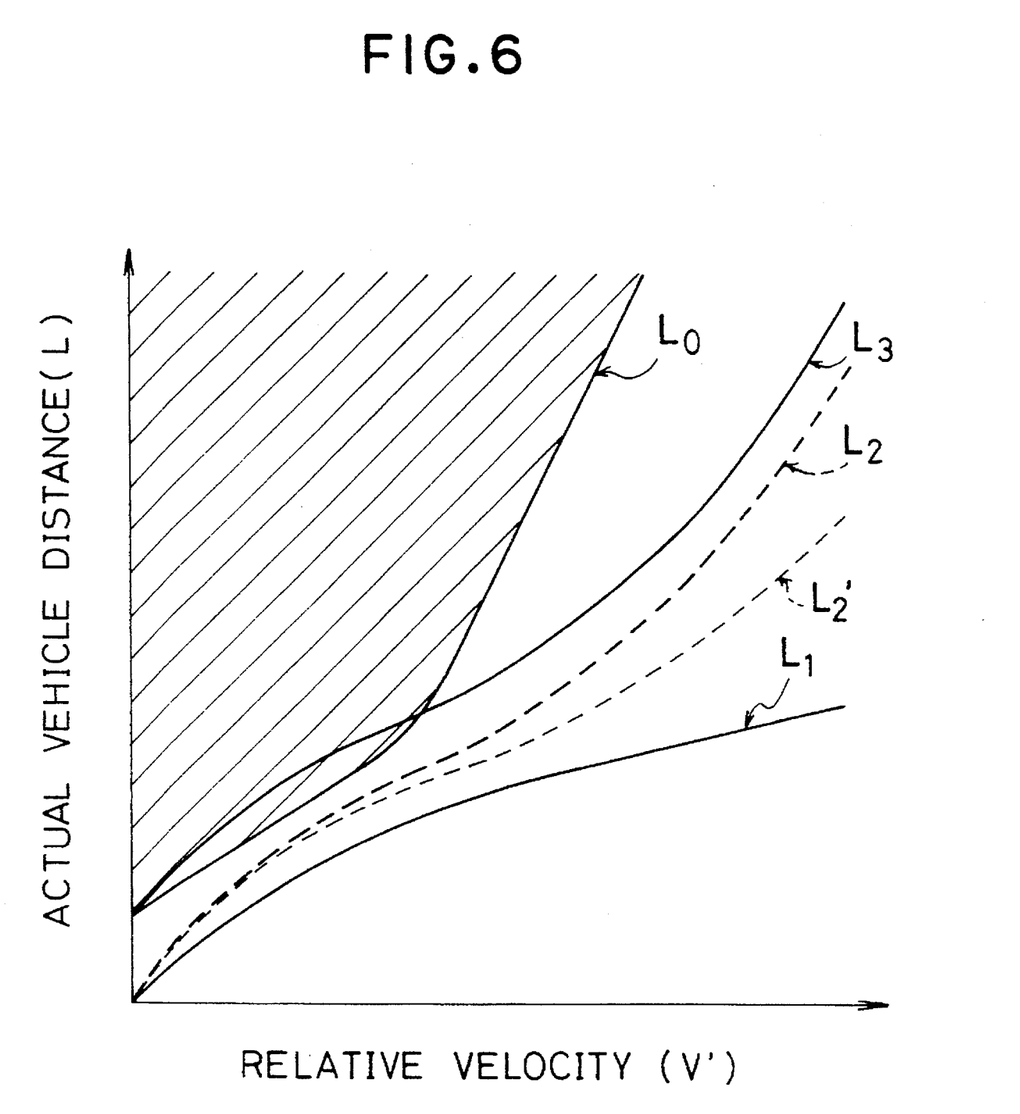
FIG. 6 is a graph showing the relationship between the relative velocity and the desired vehicle distance and warning distance.

Referring to the flow chart in FIG. 5, the operation of control unit 11 will be described in detail. First, control unit 11 calculates the velocity $V_1$ of the driving vehicle, the velocity $V_2$ of the vehicle ahead and the distance between the two vehicles based on signals from velocity sensor 6 and radar unit 10 in step S1. Next, in step S2 the desired vehicle distance $L_1$ between the two vehicles, the warning distance $L_2$ and the cancellation distance $L_3$ are calculated based on the velocities $V_1$ and $V_2$ as shown in FIG. 6. The desired vehicle distance $L_1$ between the two vehicles is the distance to be required between the driving vehicle and the vehicle ahead in chasing ($V_1$ being greater than $V_2$) and is provided by the following equation (1).

$$L_1 = (V_1)^2/2\alpha_1 g - (V_2)^2/2\alpha_2 g \tag{1}$$

Wherein $\alpha_1 g$ and $\alpha_2 g$ are the decelerations of the driving vehicle and the vehicle ahead respectively.

The warning distance $L_2$ is the standard to produce a warning before the driving vehicle reaches the desired vehicle distance (2).

$$L_2 = (V_1)^2/2\alpha_1 g - (V_2)^2/2\alpha_2 g + K(V_1 - V_2)^2 \tag{2}$$

Wherein K is the safety factor.

The cancellation distance $L_3$ is the standard to cancel the automatic braking condition by automatic braking unit 25 and is set longer than the warning distance $L_2$.

Then, in step S3 it is judged whether $V_1$ is greater than $V_2$. If the judgment is NO, namely $V_2$ is greater than $V_1$, the procedure proceeds to step S4. In step S4 it is judged whether the actual distance L is smaller than the cancellation distance $L_3$. If the judgment is YES, namely the actual distance L is smaller than the cancellation distance $L_3$, automatic braking condition is maintained in step S5 and the procedure is returned to step S1. If NO, namely the actual distance L is greater than the cancellation distance $L_3$, the automatic braking condition is canceled in step S6 and the procedure is returned to step S1.

If the judgment in step S3 is YES, namely $V_1$ is greater than $V_2$, the procedure proceeds to step S7. In step S7 it is judged whether the actual distance L is smaller than the warning distance $L_2$. If the judgment is NO, namely L is greater than $L_2$, the procedure is returned to step S1. If YES, namely L is smaller than $L_2$, warning is produced in step S8. The warning is produced by means of automatic slight braking so that the driver and crew become aware of the possibility of automatic quick braking. In this case, warning means 12 may be used together with the slight braking. Thereafter, in step S9 the slip ratio of wheels 2 and 3 in the slight braking condition is detected and the actual friction coefficient μ of road surface is calculated based on the slip ratio in order to correct or compensate the friction coefficient detected by road surface sensor 9. In step S10 the desired vehicle distance $L_1$ is corrected or compensated according to the friction coefficient μ compensated or corrected in step S9. In step S11 it is judged whether the actual distance L is smaller than the desired vehicle distance $L_1$. If the judgment is NO, namely L is greater than $L_1$, the driving vehicle is quickly applied the brakes to in step S12.

When the warning distance $L_2$ is calculated in step S2, the safety factor K may be set smaller the greater the relative velocity is. Alternatively, taking into consideration a predetermined safety ratio α as well as the safety factor K, the warning distance $L_2$ can be also provided by the following equation (3).

$$L_2 = (V_1)^2/2\alpha_1 g - (V_2)^2/2\alpha_2 g + K(V_1 - V_2)^2/2\alpha \tag{3}$$

Wherein α is smaller than the deceleration $\alpha_1 g$ of the driving vehicle, for example 0.2 g–0.3 g.

According to the present invention, the driver can manually apply the brakes to the driving vehicle in addition to the braking operation by automatic braking unit 25.

As aforementioned, control unit 11 calculates the desired vehicle distance $L_1$ based on the velocity $V_1$ of the driving vehicle and the velocity $V_2$ of the vehicle ahead, and the warning is produced by means of automatic slight braking when the actual distance L is smaller than the warning distance $L_2$ which is set based on the desired vehicle distance $L_1$. Therefore, the warning is not produced when the actual distance is much longer than the desired vehicle distance $L_1$, whereby excessive warning is prevented. As shown in FIG. 6, the greater the relative velocity V' is, the longer the warning distance $L_2$ is set. Thus, the more quickly the driving vehicle approaches the vehicle ahead, the earlier the warning is produced. Therefore the warning is produced in accordance with the manual braking so that it is prevented from making the driver feel uneasy.

According to one aspect of the present invention, the desired vehicle distance $L_1$ is precisely calculated by taking into consideration the friction coefficient μ of the road surface. Based on the desired vehicle distance $L_1$, the relative velocity and the safety factor K, the warning distance $L_2$ is properly set in accordance with the relative velocity.

According to another aspect of the present invention, the as safety factor K is set smaller, the greater the relative velocity is. Thus, as shown in FIG. 6, $L_2$ is modified to $L_2'$ in order to prevent excessive warning.

According to still another aspect of the present invention, the warning is produced by means of automatic slight braking. Thus, the warning is more reliable than the buzzer or lamp and the driver can be ready for the automatic braking.

According to a further aspect of the present invention, the friction coefficient μ of road surface is compensated based on the slip ratio of the driving vehicle in slight braking condition. Therefore, the desired vehicle distance $L_1$ and the warning distance $L_2$ are precisely calculated.

According to a still further aspect of the present invention, the driver can manually operate the brakes even in the automatic braking condition.

According to yet another aspect of the present invention, the desired vehicle distance $L_1$ is precisely calculated, taking into consideration the friction coefficient μ of road surface, and the warning distance $L_2$ is also properly set based on the desired vehicle distance $L_1$, the relative velocity, the safety factor K and the safety ratio α.

While the invention has been described with reference to specific embodiments, it will be apparent to those skilled in the art that many alternatives, modifications and variations may be made. Accordingly, the preferred embodiments of the invention as set forth herein are intended to be illustrative, not limiting. Various changes may be made without departing from the spirit and scope of the invention as defined in the following claims.

What is claimed is:

1. An automatic brake control system for automatically braking a driving vehicle according to velocities of a driving vehicle and a vehicle ahead of said driving vehicle and a vehicle distance therebetween comprising:

first detecting means for detecting respective velocities of the vehicles and the vehicle distance therebetween;

calculating means for calculating a desirable distance to be kept between the vehicles based on the respective velocities of the vehicles detected by the first detecting means;

warning means for producing a warning when an actual distance is smaller than a warning distance which, in turn, is larger than the desirable distance by a predetermined value; and setting means for automatically controlling the warning distance so that it increases as a velocity difference between the respective velocities of the vehicles is increased.

2. The automatic brake control system according to claim 1, and further comprising:

second detecting means for detecting a friction coefficient of a road surface, and third detecting means for detecting a deceleration of the driving vehicle and the vehicle ahead of said driving vehicle, wherein said desirable distance is compensated based upon said friction coefficient and said deceleration is used to determine said warning distance.

3. The automatic brake control system according to claim 2, wherein the desirable distance and the warning distance are provided by the following equations:

$$L_1 = (V_1)^2/2\alpha_1 g - (V_2)^2/2\alpha_2 g; \text{ and}$$

$$L_2 = (V_1)^2/2\alpha_1 g - (V_2)^2/2\alpha_2 g + K(V_1 - V_2)^2;$$

wherein $L_1$ is the desirable distance, $L_2$ is the warning distance, $V_1$ and $V_2$ are the velocities of the driving vehicle and the vehicle ahead of said driving vehicle, respectively, g is the acceleration of gravity, $\alpha_1 g$ and $\alpha_2 g$ are the decelerations of the driving vehicle and the vehicle ahead of said driving vehicle, respectively, and K is a safety factor.

4. The automatic brake control system according to claim 3, wherein the safety factor is reduced as a difference between the velocities of the driving vehicle and the vehicle ahead of said driving vehicle, detected by the first detecting means, is increased.

* * * * *